(12) United States Patent
Costigan (10) Patent No.: US 10,085,536 B1
(45) Date of Patent: Oct. 2, 2018

(54) BACKPACK SUPPORT DEVICE (71) Applicant: David Costigan, New Market, MD (US)

(72) Inventor: David Costigan, New Market, MD (US)

( * ) Notice: Subject to any disclaimer, the term of this patent is extended or adjusted under 35 U.S.C. 154(b) by 102 days.

(21) Appl. No.: 15/333,515

(22) Filed: Oct. 25, 2016

(51) Int. Cl.
A45F 4/00 (2006.01)
A45F 4/02 (2006.01)
A45C 13/38 (2006.01)
B62B 1/14 (2006.01)
A45F 3/04 (2006.01)

(52) U.S. Cl.
CPC .............. A45C 13/385 (2013.01); A45F 3/04 (2013.01); B62B 1/14 (2013.01); B62B 2202/00 (2013.01)

(58) Field of Classification Search
CPC ......... A45C 13/385; A45C 15/00; B62B 1/14; B62B 2202/00; A45F 3/04; A45F 3/00; A45F 2003/003; A45F 5/02
USPC ........................................ 224/576, 577, 153
See application file for complete search history.

(56) References Cited

U.S. PATENT DOCUMENTS

| | | | | |
|---|---|---|---|---|
| 3,046,031 A * | 7/1962 | Reynolds | ................. | B62B 1/10 280/47.24 |
| 3,199,891 A * | 8/1965 | Grable | ................. | B60G 11/14 280/47.31 |
| 3,237,940 A * | 3/1966 | Johnson | ................. | A61H 3/04 16/35 R |
| 3,265,260 A * | 8/1966 | Romney | ................. | A45F 3/08 224/161 |
| 3,266,686 A * | 8/1966 | Griffith | ................. | A45F 4/02 224/155 |
| 3,282,375 A * | 11/1966 | Ray | ................. | A01M 31/02 182/116 |
| 3,550,997 A * | 12/1970 | Strand | ................. | A45F 4/02 224/153 |
| 4,045,040 A * | 8/1977 | Fails | ................. | A01M 31/006 182/118 |
| 4,236,723 A * | 12/1980 | Lemmon | ................. | B62B 5/068 280/1.5 |
| 4,664,395 A * | 5/1987 | McCoy | ................. | B62B 5/068 224/153 |
| 5,005,844 A * | 4/1991 | Douglas | ................. | B62B 5/068 172/350 |
| 5,062,651 A * | 11/1991 | Varieur | ................. | B62B 5/068 280/1.5 |
| 5,289,958 A * | 3/1994 | Jay | ................. | A47C 4/52 224/153 |

(Continued)

Primary Examiner — Nathan J Newhouse
Assistant Examiner — Lester L Vanterpool (57) ABSTRACT The backpack support device is an accessory that is configured to interface with a backpack and an end user in order to help carry the weight of the backpack with the end user. The backpack support device is constructed of a basket member that includes a waist strap along a front surface of the basket member. The basket member is configured to receive a backpack therein. The waist strap is adapted to interface with a waist of an end user while said end user carries said backpack via shoulder straps of said backpack. The basket member is further defined with a base member. A pair of vertical armatures extends downwardly on opposing sides of the basket member. Each of the pair of vertical armatures is further defined with a bottom end. The bottom end of each of the pair of vertical armatures includes a wheel that mobilizes the device.

8 Claims, 6 Drawing Sheets

(56) References Cited

U.S. PATENT DOCUMENTS

| | | | | |
|---|---|---|---|---|
| 5,385,355 | A * | 1/1995 | Hoffman | B62B 5/068 280/1.5 |
| D387,198 | S | 12/1997 | Lehmann | |
| 5,769,431 | A * | 6/1998 | Cordova | B62B 5/068 280/1.5 |
| 6,139,033 | A * | 10/2000 | Western | B62B 1/02 280/1.5 |
| 6,315,177 | B1 * | 11/2001 | Weatherall | A45F 3/15 224/153 |
| 6,467,559 | B1 * | 10/2002 | Farrell | A63C 11/10 180/180 |
| 7,322,584 | B1 * | 1/2008 | Parker | B62B 1/18 280/416 |
| 7,377,411 | B1 * | 5/2008 | Stewart | B60R 7/043 224/197 |
| 7,484,737 | B2 * | 2/2009 | Satorius | A45F 3/14 280/1.5 |
| 8,672,202 | B2 * | 3/2014 | Tayar | A45C 13/385 224/153 |
| 8,708,206 | B2 | 4/2014 | Onessimo | |
| 8,893,937 | B1 * | 11/2014 | Bristol | B62B 5/068 224/153 |
| 9,357,853 | B2 * | 6/2016 | Oh | A47D 13/025 |
| 9,364,060 | B2 * | 6/2016 | Bristol | B62B 5/068 |
| 2006/0237918 | A1 * | 10/2006 | Satorius | A45F 3/14 280/1.5 |
| 2006/0240960 | A1 * | 10/2006 | Shahinpoor | A63B 69/18 482/121 |
| 2007/0075105 | A1 * | 4/2007 | Petrin | A45C 5/146 224/153 |
| 2008/0174078 | A1 * | 7/2008 | Dooley | A45F 3/08 280/1.5 |
| 2010/0051657 | A1 * | 3/2010 | Onessimo | A45F 3/04 224/153 |
| 2013/0228602 | A1 * | 9/2013 | Thiruppathi | A45F 3/08 224/625 |
| 2014/0209646 | A1 * | 7/2014 | Hoppa | A45F 3/08 224/261 |
| 2016/0229438 | A1 * | 8/2016 | Morse | B62B 5/068 |

* cited by examiner

BACKPACK SUPPORT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of backpacks, more specifically, a device that aids in supporting the load attributed with a backpack.

SUMMARY OF INVENTION

The backpack support device is an accessory that is configured to interface with a backpack and an end user in order to help carry the weight of the backpack with the end user. The backpack support device is constructed of a basket member that includes a waist strap along a front surface of the basket member. The basket member is configured to receive a backpack therein. The waist strap is adapted to interface with a waist of an end user whilst said end user carries said backpack via shoulder straps of said backpack. The basket member is further defined with a base member. A pair of vertical armatures extends downwardly on opposing sides of the basket member. Each of the pair of vertical armatures is further defined with a bottom end. The bottom end of each of the pair of vertical armatures includes a wheel that mobilizes the device. The wheel of each of the pair of vertical armatures is adapted to interface with a ground surface whilst an end user walks ahead of said wheel. The basket member includes at least one strap that is configured to extend upwards as well as forwards in order to interface with one of the shoulder straps of said backpack.

It is an object of the invention to provide a wheeled accessory that works in concert with a backpack and an end user to aid in carrying a load associated with said backpack.

These together with additional objects, features and advantages of the backpack support device will be readily apparent to those of ordinary skill in the art upon reading the following detailed description of the presently preferred, but nonetheless illustrative, embodiments when taken in conjunction with the accompanying drawings.

In this respect, before explaining the current embodiments of the backpack support device in detail, it is to be understood that the backpack support device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the backpack support device.

It is therefore important that the claims be regarded as including such equivalent construction insofar as they do not depart from the spirit and scope of the backpack support device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The backpack support device 100 (hereinafter invention) comprises a basket member 101. The basket member 101 is further defined with a base member 102. A vertical mesh support 103 extends upwardly from a bottom perimeter 104 of the base member 102. The base member 102 and the vertical mesh support 103 form the basket member 102. The basket member 102 is open from above, and is further defined with a top perimeter 105. The top perimeter 105 of the vertical mesh support 103 corresponds with the bottom perimeter 104 of the base member 102.

Figure 1:
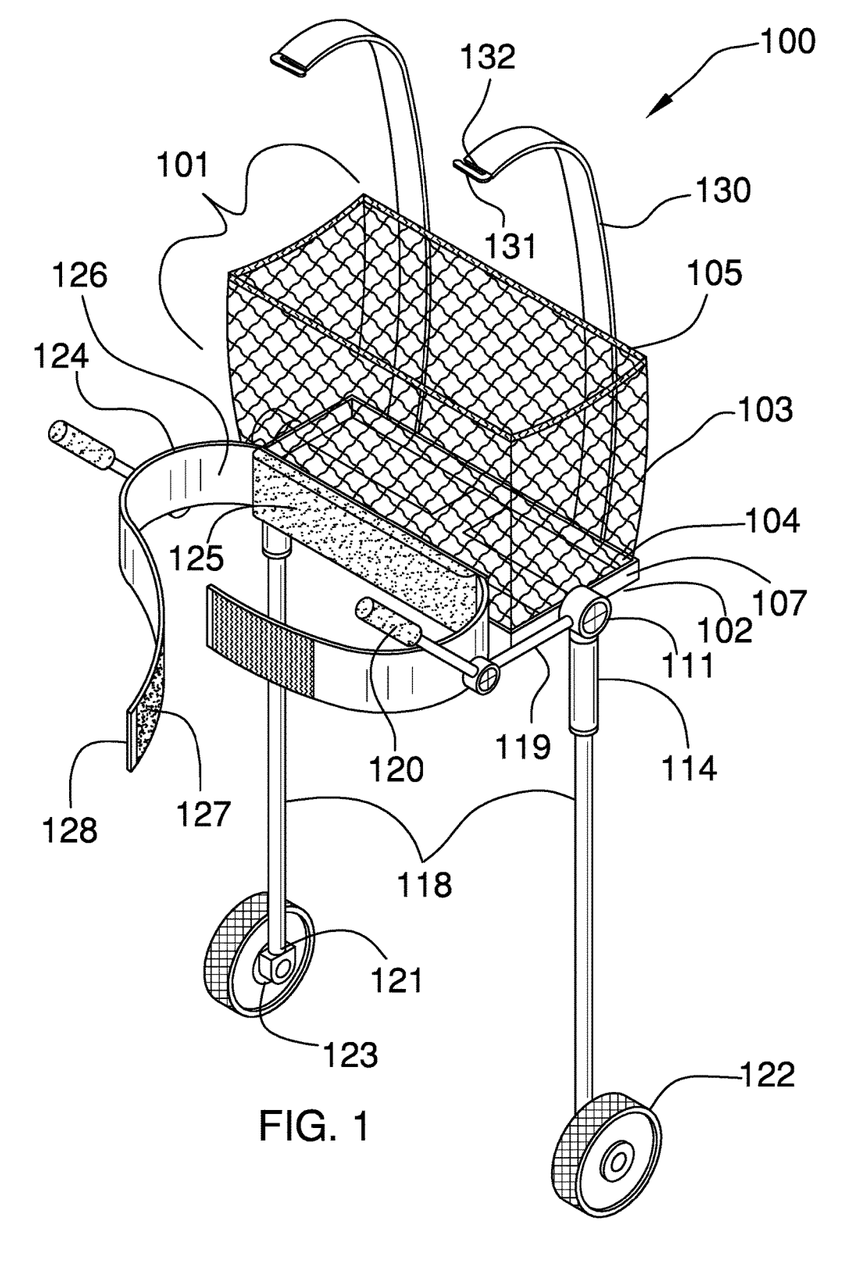
FIG. 1 is a perspective view of an embodiment of the disclosure.
Figure 2:
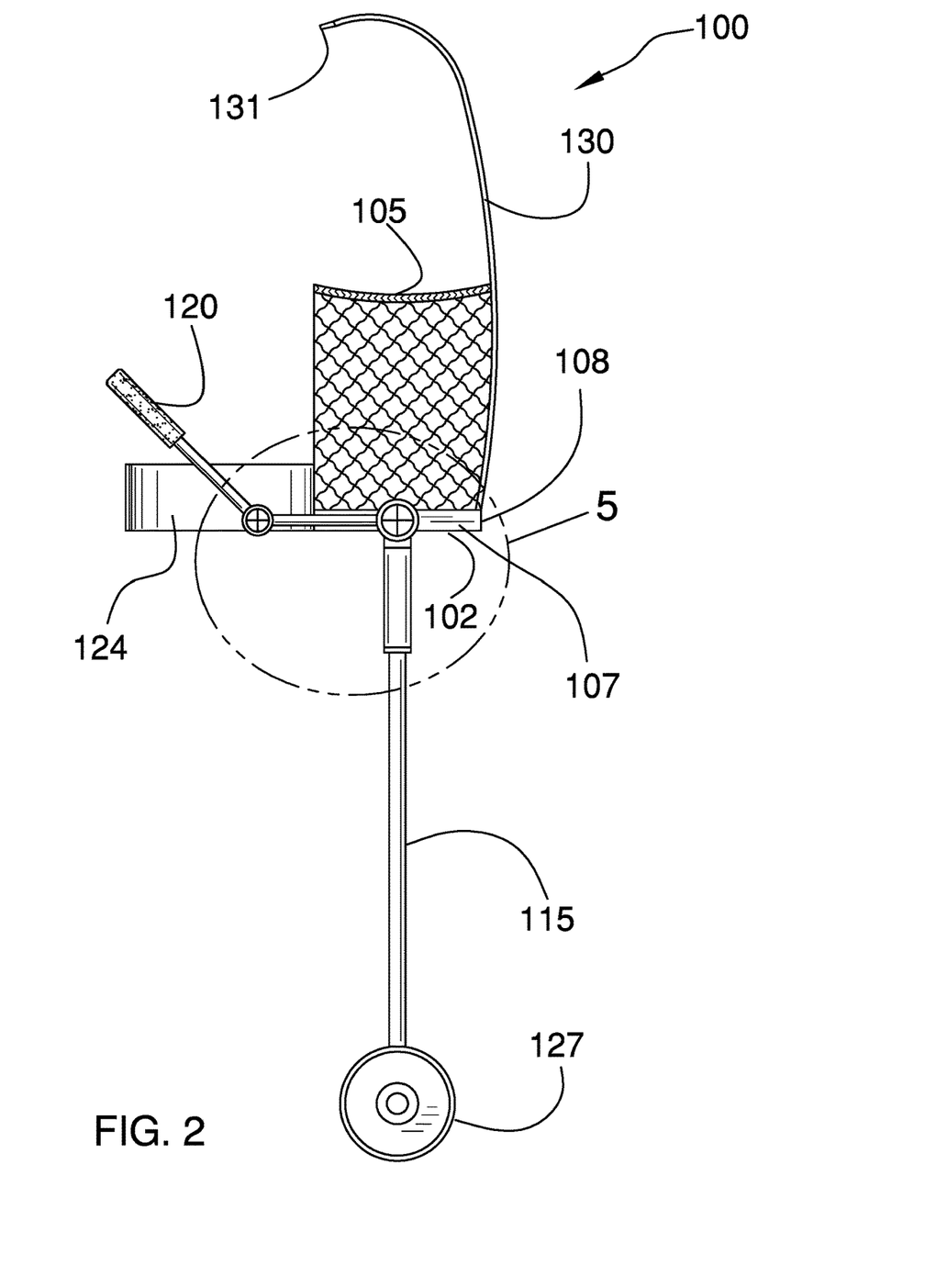
FIG. 2 is a side view of an embodiment of the disclosure.
Figures 3, 4:
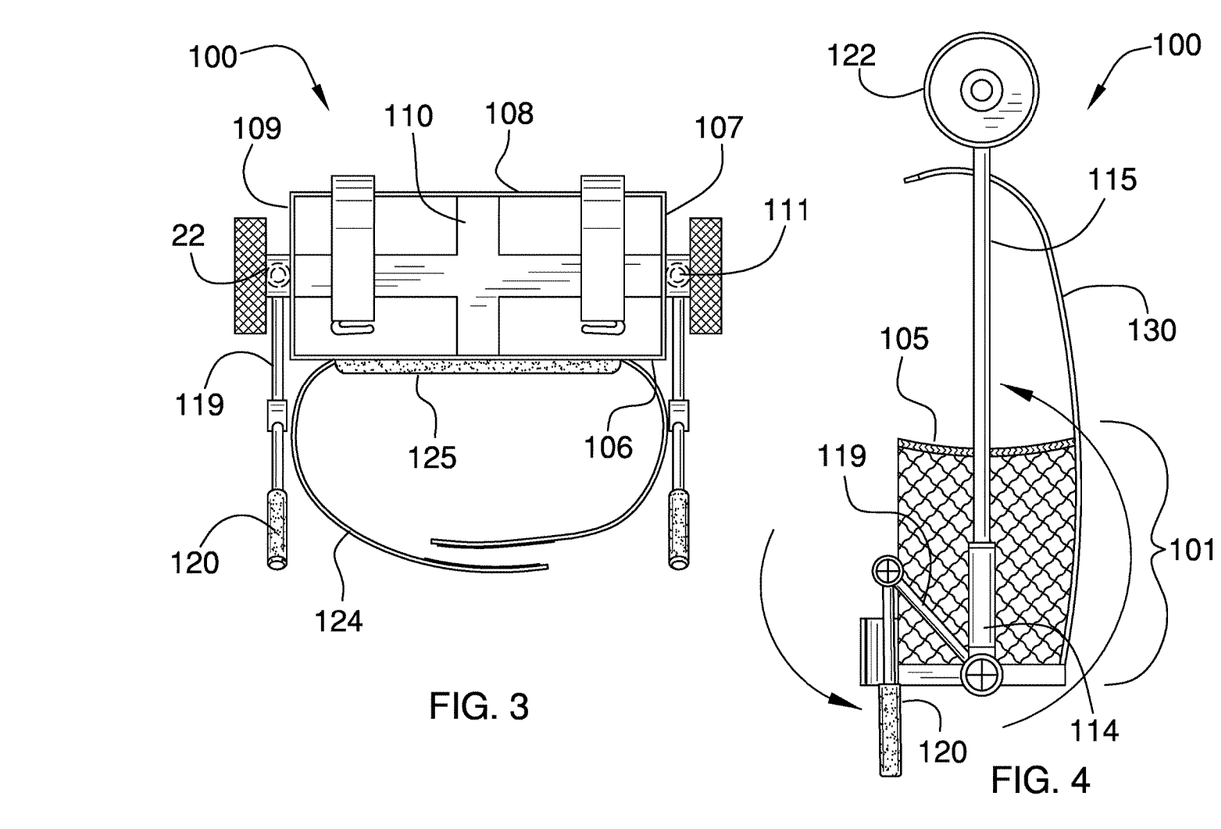
FIG. 3 is a top view of an embodiment of the disclosure.
FIG. 4 is another side view of an embodiment of the disclosure.
Figure 5:
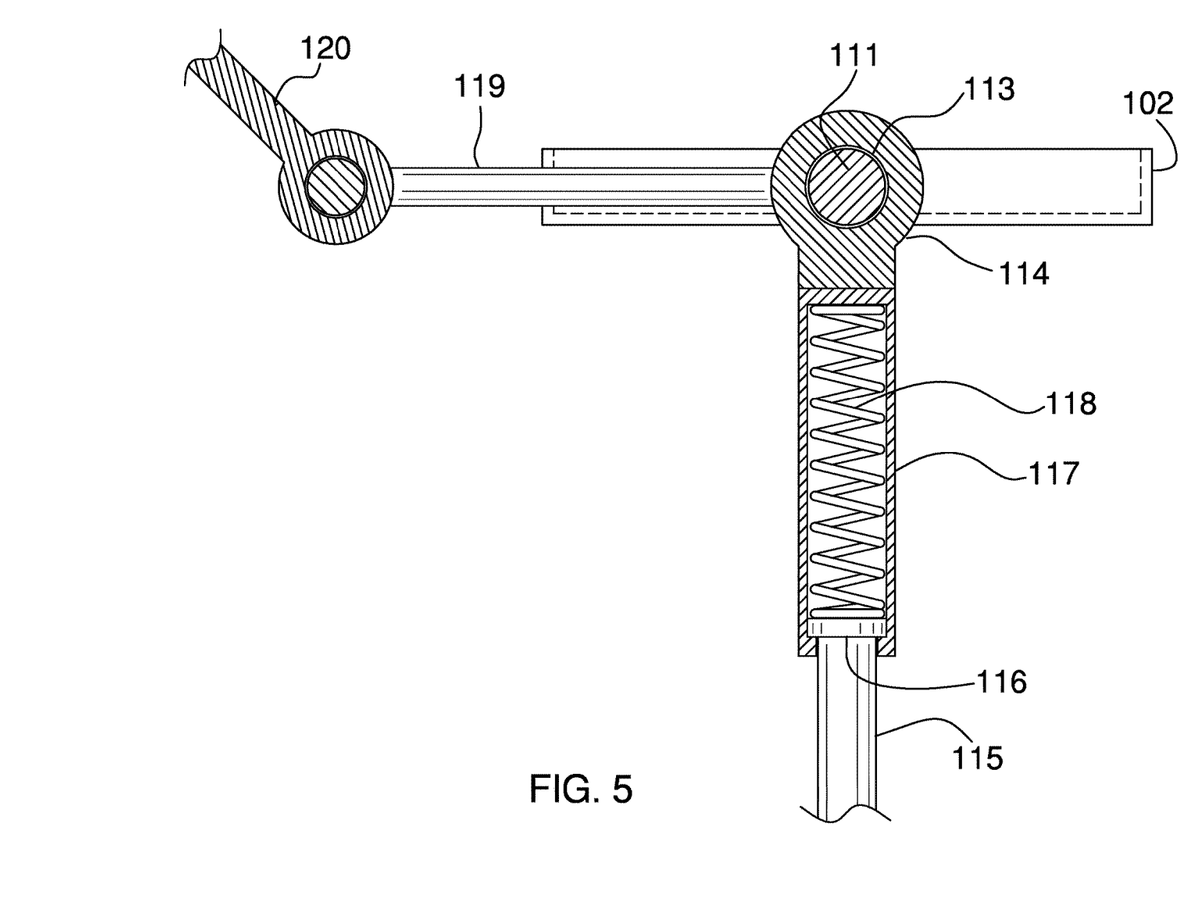
FIG. 5 is a cross-sectional view of an embodiment of the disclosure across 5-5 as shown in FIG. 2.

It shall be noted that the base member 102 is generally planar, and is polygonal in shape. Moreover, FIGS. 1 and 3, depict the base member 102 as including a "plus" shaped member 110 that is surrounded via the bottom perimeter 104. Ideally, the bottom perimeter of the base member 102 has a square or rectangular shape, and the vertical mesh support 103 extends vertically along all sides of the base member 102. That being said, the bottom perimeter 104 of the base member 102 is further defined with a front face 106, a left face 107, a rear face 108, and a right face 109. The base member 102 is parallel with a ground surface 200.

The basket member 101 is configured to receive a backpack 300 therein. As previously mentioned, the basket member 101 is open from above, and enables the backpack 300 to be placed within the confines of the vertical mesh support 103. Moreover, the invention 100 is configured to be used with the backpack 300 whilst said backpack 300 is worn on an end user 400.

The base member 102 includes a left member 111 provided on the left face 107. The base member 102 also includes a right member 112 provided on the right face 109. The left member 111 extends outwardly with respect to the left face 107 of the base member 102. The right member 112 extends outwardly with respect to the right face 109 of the base member 102. The left member 111 and the right member 112 each include a spring member 113 that interfaces with a pivot armature 114. The pivot armature 114 is in mechanical connection with one of a pair of vertical armatures 115.

Figure 6:
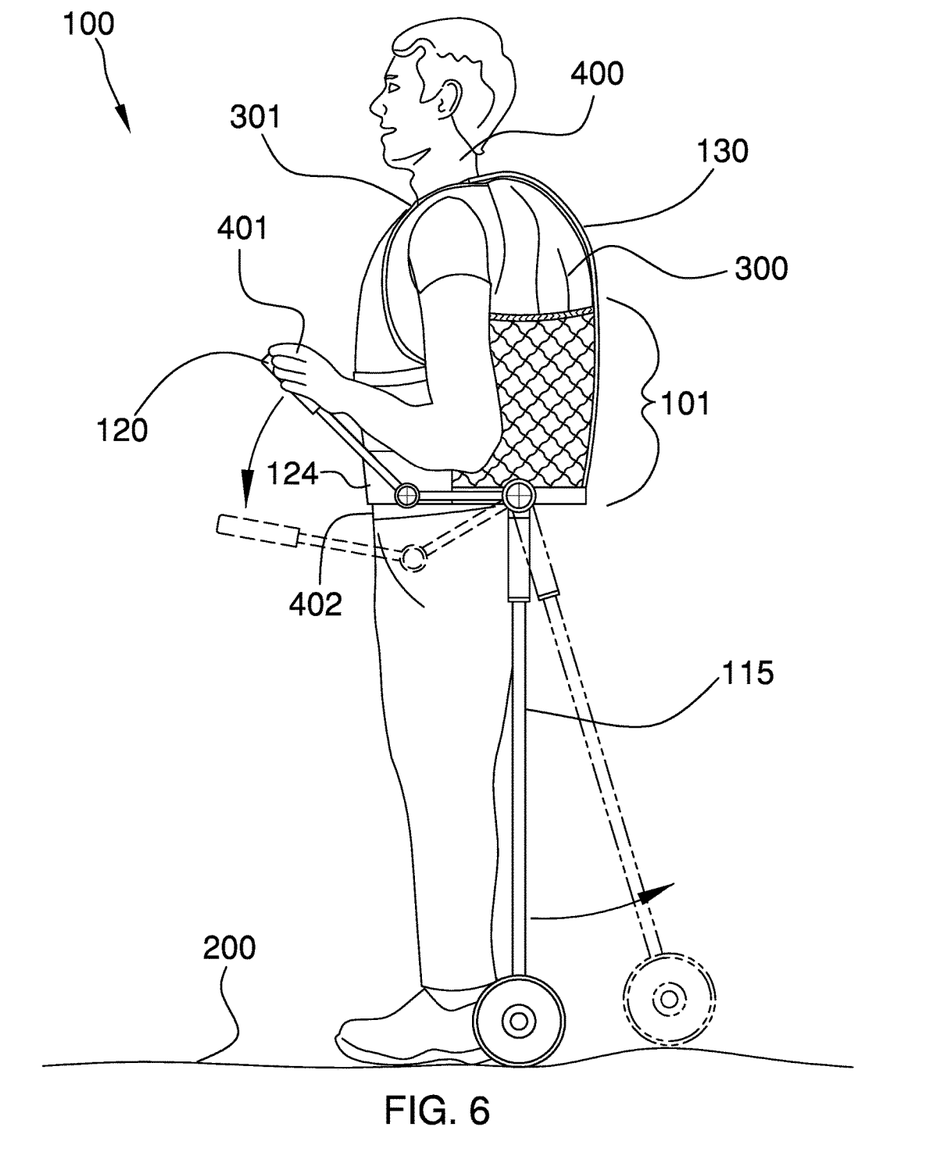
FIG. 6 is a view of an embodiment of the disclosure in use.

The pair of vertical armatures 115 is each further defined with a top shoulder 116. The top shoulder 116 of each of the pair of vertical armatures 115 is biased downwardly within a cavity 117 of the pivot armature 114 via a cavity spring 118. The pivot armature 114 is provided on the left side as well as the right side of the base member 102. Moreover, the pivot armature 114 is able to pivot or rotate with respect to the left member 111 and the right member 112, respectively. The pivot armature 114 is attached to a horizontal armature 119. A handle member 120 is attached to the horizontal armature 119. Referring to FIG. 6, the handle 120 is adapted to interface with a hand 401 of the end user 400 in order to rotate the respective one of the pair of vertical armatures 115 with respect to the invention 100.

Each of the pair of vertical armatures 115 is further defined with a bottom distal end 121. A wheel 122 is rotatably engaged with a wheel bearing 123. The wheel bearing 123 interfaces between the wheel 122 and the bottom distal end 121 of a one of the pair of vertical armatures 115. The wheel 122 mobilizes the invention 100 with respect to the ground surface 200.

The invention 100 includes a waist strap 124. The waist strap 124 is affixed to the front surface 106 of the base member 102. A padded member 125 is provided on an inner surface 126 of the waist strap 124. The waist strap 124 includes fasteners 127 at distal ends 128. The waist strap 124 is adapted to wrap around a waist 402 of the end user 400. Moreover, the waist strap 124 is made of a flexible material, which is ideally a fabric. The fasteners 127 of the distal ends 128 of the waist strap 124 are adapted to secure the waist strap 124 around the waist 402 of the end user 400. The padded member 125 is adjacent to the base member 102.

At least one strap 130 is affixed to the base member 102. The at least one strap 130 extends around to interface with a shoulder strap 301 of the backpack 300. The at least one strap 130 is used to further secure the backpack 300 to the basket member 101, and to enable the invention 100 to partially carry weight attributed to the backpack 300 when in use. The at least one strap 130 includes a clip 131 that is configured to clip onto the shoulder strap 301 of the backpack 300. The clip 131 is provided at a top end 132 of the at least one strap 130. The at least one strap 130 is made of a flexible material such as a fabric.

Figure 7:
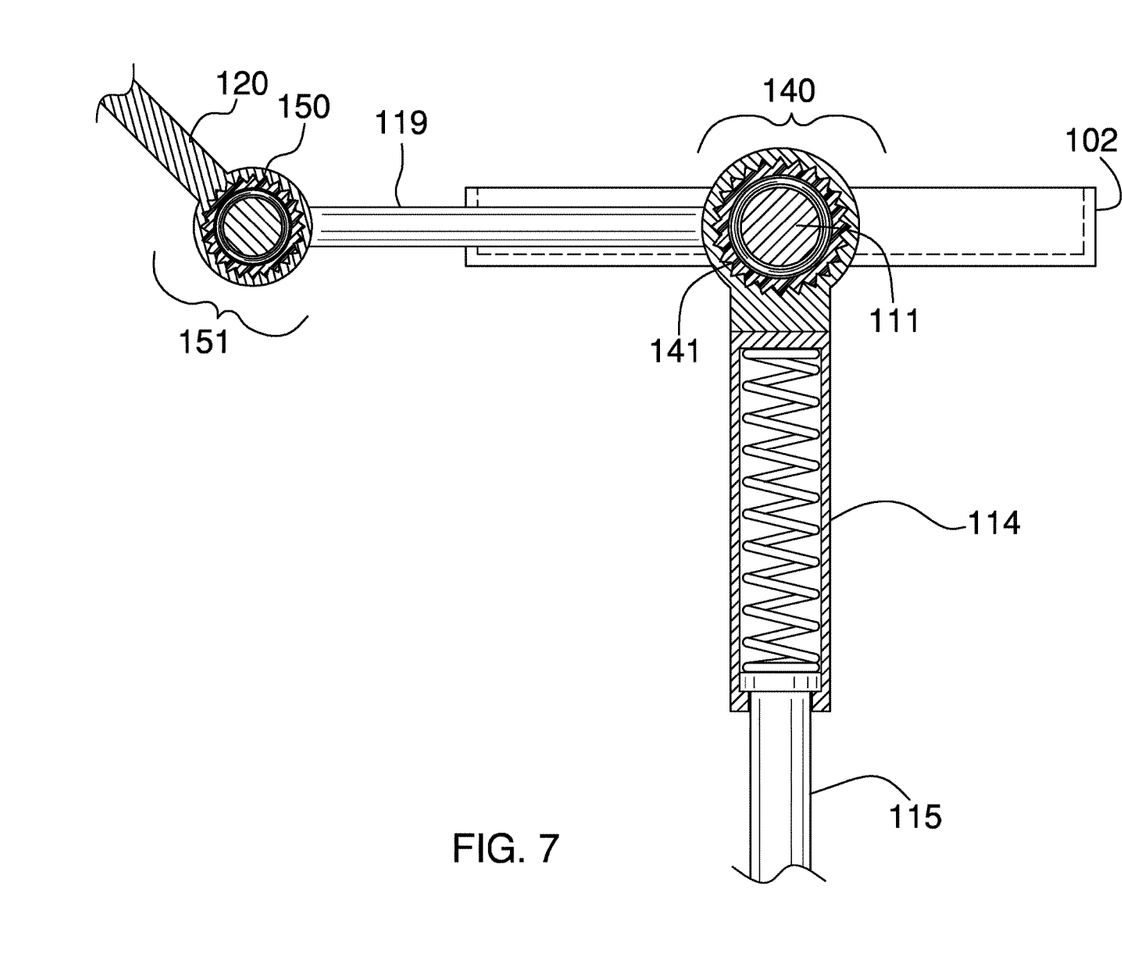
FIG. 7 is another cross-sectional view of an embodiment of the disclosure across 5-5 as shown in FIG. 2.

Referring to FIG. 7, the invention 100 may include a gearing system that is incorporated into the handle 120, the horizontal member 119, and the pivot armature 114. Moreover, the gearing system would enable one of the pair of vertical armatures 114 to rotate to a vertical orientation (see FIG. 4) in order to eliminate an interface of the wheel 122 with respect to the ground surface 200. A first spring-loaded locking gear 140 interfaces at a first joint 141. The first joint 141 is provided where the pivot armature 114 and the horizontal member 119 connect. A second spring-loaded locking gear 150 interfaces at a second joint 152. The second joint 152 is provided where the horizontal member 119 and the handle 120 connect.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A backpack support device comprising:
a basket member that is configured to receive a backpack;
wherein the basket member and the backpack are adapted to be positioned against an end user such that said backpack is being worn against said end user;
wherein a pair of vertical armatures extend down from the basket member;
wherein each of the pair of vertical armatures includes a wheel that is adapted to interface with a ground surface such that the backpack support device is configured to support a portion of weight attributed with said backpack;
wherein the basket member is further defined with a base member;
wherein a vertical mesh support extends upwardly from a bottom perimeter of the base member;
wherein the base member and the vertical mesh support form the basket member;
wherein the basket member is open from above, and is further defined with a top perimeter;
wherein the backpack is configured to be inserted into the basket member;
wherein the top perimeter of the vertical mesh support corresponds with the bottom perimeter of the base member;
wherein the base member is planar, and is polygonal in shape;
wherein the base member includes a "plus" shaped member that is surrounded via the bottom perimeter;
wherein the vertical mesh support extends vertically along all sides of the base member;
wherein the bottom perimeter of the base member is further defined with a front face, a left face, a rear face, and a right face;
wherein the base member is configured to be parallel with said ground surface;

wherein the base member includes a left member provided on the left face;

wherein the base member includes a right member provided on the right face;

wherein the left member extends outwardly with respect to the left face of the base member;

wherein the right member extends outwardly with respect to the right face of the base member;

wherein the left member and the right member each include a spring member that interfaces with a pivot armature;

wherein the pivot armature is in mechanical connection with one of the pair of vertical armatures;

wherein the pair of vertical armatures is each further defined with a top shoulder;

wherein the top shoulder of each of the pair of vertical armatures is biased downwardly within a cavity of the pivot armature via a cavity spring;

wherein the pivot armature is provided on the left side as well as the right side of the base member;

wherein the pivot armature is able to pivot or rotate with respect to the left member and the right member, respectively.

2. The backpack support device according to claim 1 wherein the pivot armature is attached to a horizontal armature; wherein a handle member is attached to the horizontal armature.

3. The backpack support device according to claim 2 wherein the handle is adapted to interface with a hand of the end user in order to rotate the respective one of the pair of vertical armatures with respect to the base member.

4. The backpack support device according to claim 3 wherein each of the pair of vertical armatures is further defined with a bottom distal end.

5. The backpack support device according to claim 4 wherein the wheel is rotatably engaged with a wheel bearing at the bottom distal end of a one of the pair of vertical armatures; wherein the wheel bearing interfaces between the wheel and the bottom distal end of the one of the pair of vertical armatures such that the wheel mobilizes the backpack support device with respect to the ground surface.

6. The backpack support device according to claim 5 wherein a waist strap is affixed to the front surface of the base member; wherein a padded member is provided on an inner surface of the waist strap; wherein the waist strap includes fasteners at distal ends; wherein the waist strap is adapted to wrap around a waist of the end user; wherein the waist strap is made of a flexible material; wherein the fasteners of the distal ends of the waist strap are adapted to secure the waist strap around the waist of the end user; wherein the padded member is adjacent to the base member.

7. The backpack support device according to claim 6 wherein at least one strap is affixed to the base member; wherein the at least one strap extends around to interface with a shoulder strap of the backpack; wherein the at least one strap is used to further secure the backpack to the basket member, and to enable the backpack support device to carry weight attributed to the backpack when in use.

8. The backpack support device according to claim 7 wherein the at least one strap includes a clip that is configured to clip onto the shoulder strap of the backpack; wherein the clip is provided at a top end of the at least one strap.

\* \* \* \* \*